United States Patent
Wilkens et al.

[11] 3,732,393
[45] May 8, 1973

[54] ELECTRIC ARC WELDING PROCESS

[75] Inventors: Gunther Wilkens; Hansfriedrich Lehmler; Alfred Krahl, all of Frankfurt/Main, Germany

[73] Assignee: Messer Griesheim GmbH, Frankfurt/Main, Germany

[22] Filed: Aug. 31, 1971

[21] Appl. No.: 176,578

[30] Foreign Application Priority Data

Sept. 3, 1970  Germany..................P 20 43 640.2

[52] U.S. Cl................................219/137, 219/130
[51] Int. Cl..............................................B23k 9/00
[58] Field of Search....................219/137, 130, 73, 219/74, 75

[56] References Cited

UNITED STATES PATENTS 3,634,650  1/1972  Nomura...........................219/137
3,252,511  5/1966  Gerber............................219/137 X
3,545,945  12/1970  Peterson................................29/199
3,609,292  9/1971  Arnoldy..............................219/137
3,527,919  9/1970  Stern et al. ........................219/137
3,428,774  2/1969  Faust et al. .....................219/137 X
3,590,211  6/1971  Ballass.................................219/137
3,627,974  12/1971  Normando.......................219/131 R Primary Examiner—J. V. Truhe
Assistant Examiner—Gale R. Peterson
Attorney—Connolly and Hutz

[57] ABSTRACT

An electric arc welding process for welding together sheets of unalloyed or low alloyed structural steel utilizes a consumable wire electrode under shielded gas and is characterized in that the welding is conducted with a voltage of 25 to 40 V at a current density of 300–400 A/mm$^2$ wire electrode cross-section with the wire electrode having a diameter of about 0.8–1.2 mm and the shielded gas containing at least some $CO_2$.

10 Claims, 4 Drawing Figures

ELECTRIC ARC WELDING PROCESS

BACKGROUND OF INVENTION

Machined overhead welding is preferred in instances wherein the turning over of the work piece is too expensive and wherein the other seam side is inaccessible or the welding should occur at both sides without having to turn the work pieces.

In shipbuilding, this problem occurs in the preparation of large panels, which are assembled from sheets of about 10–50 mm thickness. The turning over of such panels presents difficulties because of their large size; on the other hand, bilateral welding offers welding joints of high value with small seam volume. In these instances, an X-seam is advantageously employed whose first position is welded in the overhead situation.

It is known to carry out this root welding by means of the short arc process; while from above, the remaining seam joint is filled by means of submerged arc welding.

The short arc welding process relates to an electric arc welding process under protective gas, wherein the effective substance transfer from the wire electrode to the work piece occurs by dip transmission, i.e. by short circuit between the smelting bead forming at the wire electrode and the smelting bath.

In order to be able to execute by means of this process a satisfactory welding seam having the required quality in the overhead position, one must work with relatively small voltage and current values which allow only relative low smelting power and welding speeds (about up to 40 cm/min.).

The welding bath in short arc welding is relatively small and hardens quickly so that the smelt is not inclined to drip off.

Since the seam cross-section achievable with one layer in short arc welding is only small and the welding speed and smelting power are not satisfactory, it has been proposed to increase the values of welding current and welding voltage. In using carbon dioxide as a protective gas, however, one gets into an area of an unsteady arc with a strong spattering formation. Because of the falling of the spatter, this range of adjustment is not particularly advantageous for overhead welding. In the use of a mixed gas, in higher working factors a spray arc is achieved which is characterized in that many beads of material are transferred in a spray-like fashion without short circuiting from the wire electrode to the work piece. The welding bath formed with the lastly-named process is highly fluid and more difficult to control in overhead welding.

In order to avoid the dripping of the welding smelt, the welding speed was increased. The welding bath was cooled off more quickly thereby. This in turn has the effect that with equal electric welding data, the seam cross-section may be lessened and finally is no longer sufficient to produce from the opposite side sufficient bath safety for overhead welding. The object for this bath safety is to weld the sheet of metal deeply enough and to prevent the welding bath necessary therefor from dripping off.

The experiment to hold the welding bath by follow-up skids made of copper, which are cooled, and simultaneously to smooth the seam, similarly to the way it is done in electroslag welding, did not bring about the desired result.

SUMMARY OF INVENTION

The object of the invention is to provide a machined overhead welding process wherein the welding bath may be controlled, although the high requirements of penetration of burning, smelting effect and welding speed are fulfilled.

For the solution of this problem, a process for the welding together of sheets of metal, particularly of sheets made of unalloyed and/or low-alloyed structural steel, is suggested according to the invention by means of the electric arc welding process with a consumable wire electrode under shielded gas in the overhead position, the welding being conducted with a voltage of 25 to 40 V and preferably 31–32 V, the current density being 300 – 400 mm² wire electrode cross-section, the wire electrode being of about 0.8 – 1.2 mm diameter, and the shielded gas being $CO_2$ or a gas mixture containing $CO_2$. The arc is maintained short.

THE DRAWINGS

DETAILED DESCRIPTION

Figure 1:
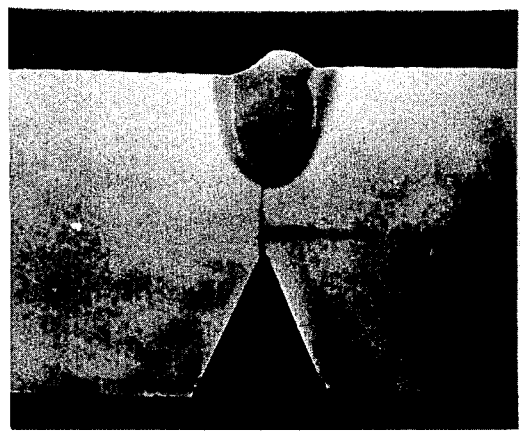
FIG. 1 is a photomicrograph inverted 180° showing the results achieved in accordance with this invention.

With the inventive process it is possible to fill in the overhead position a seam joint of a size sufficiently large for the root seam with a sufficiently deep penetration and high welding speed. It has been proven to be particularly advantageous to weld a wire electrode having a 1 mm diameter under $CO_2$ with 260 – 280 A at 31 – 32 V. Here a smooth, relatively fine-beaded substance transfer which is free of short circuits and low on sputtering, leading to a smelting capacity of 6 – 6.5 kg/hr. and making possible an average welding speed of about 700 mm/min.

In the novel process, a gas mixture containing $CO_2$ as the shielded gas may be employed. With a gas mixture consisting of 82 percent argon and 18 percent carbon dioxide, good welding seams may be achieved with a current density of 350 A/mm² wire electrode cross-section. The protective gas thereby includes a significant amount of $CO_2$ (e.g. 18 percent). The requirements of accuracy of the seam joint preparation here, however, must be more strict than in using carbon dioxide. Since, furthermore, greater security against pore formation exists in using carbon dioxide and the penetration of burning is somewhat greater than under an $Ar/CO_2$ mixture, carbon dioxide is preferred as protective gas.

The advantage of the novel process is that a welding seam may be prepared in the overhead position, which is free of pores, rips, marginal notches, and bead penetration, and wherein the welding substance introduced satisfactorily adheres in the prepared welding joint despite the relative large welding bath and the amount of welding substance supplied.

Thus it was proven, contrary to all expectations, that this MAG (i.e. Metall-Aktiv-Gas-Schweissen or Active-Gas-Metal-Arc Welding) high output welding process may be used not only in the so-called H. V. or gravity position.

To carry out welding in the H. V. or gravity position with such high specific values is indeed known, for example, from the publication of Dr. W. Hummitzsch in the technical journal *Schweissen und Schneiden*, 1962, No. 12, pp. 544–65, with the title "Lichtbogenschweissen mit hohen Stroemen unter Kohlendioxyd als Schutzgas" and the journal *Stahl und Eisen*, 85, 1965, No. 19, pp. 1,186–95, with the title "Die Lichbogenschweissung von Baustaehlen unter reinem Kohlendioxyd-Schutzgas". However, this publication does not teach working with high specific values in overhead welding also. The subject matter of these publications are incorporated herein by reference thereto.

Viscosity and surface voltage of the melts are decisive for the greater or lesser tendency of a welding bath of certain size to drip off. Both magnitudes may be influenced by the chemical composition of the wire electrode. For the execution of the novel process, wire electrodes are therefore preferred which contain in increased, metallurgically still replaceable amounts the alloying elements increasing the smelting viscosity, such as silicon, manganese, chromium.

Even the thickness of the wire electrode, with which the novel process is carried out, is of importance, since with increasing values, the size of the melt beads changing in the arc grows and consequently the spray losses in $CO_2$ atmosphere may increase.

A quiet arc and welding bath procedure is supported according to the invention in that the wire substance is supplied constantly in a non-twisting and free from slipping manner. In addition, the torch set close to the work piece must be conducted exactly in the center of the seam joint and should be situated as vertically or perpendicular as possible to the sheet surface.

In order to prevent a piercing of the arc during the work process, it is suggested according to the invention that during the welding in the overhead position, the welding torch be moved in a pendulum-like manner over the welding slot, the pendulum amplitude being 0.5 – 2 mm. Thereby it is achieved that the arc base departs the seam joint sides. In addition, the penetration at the sides is therefore better and the danger of the arc piercing through the welding joint slot is smaller. The pendulum frequency is adapted to the welding speed in such a manner that there results no zig-zag weld bead.

In a cross-pendulum movement the arc is shortened in its travel from the joint center to the sheet side. These changes of the arc length may eventually lead to an influencing of the arc - and welding bath procedure. In order to avoid this effect, it is suggested by the invention that the pendulum movement of the torch, proceeding at right angles to the seam, be heterodyned by an up and down movement, the torch following approximately the joint profile. The amplitudes of both movements are relatively small. In view of the welding procedure, penetration depth, and spray losses, a semi-circular pendulum movement with a 1 mm radius is particularly advantageous.

For the execution of the novel process, especially suitable are DC sources whose volt-ampere characteristics are smooth enough for a sufficiently sensitive inside regulation of the electrode smelting (sloping about 3–5 V per 100 A) and whose inductivity is measured by supplementary coils in such a manner that in a still good ignition condition, sudden momentary arc contractions, as they occur, for example, in the cross-pendulum movement of the torch, do not lead to high current peaks. In the use of such current sources an arc of about constant length and current intensity is produced and a smooth welding process, low on sputtering, is achieved.

An X seam with a 4 mm high cross-piece has shown itself to be particularly advantageous for the edge preparation. The joint opening width should be 4–5 mm.

In the execution of the novel process, the welding torch advantageoulsy is constantly conducted in the seam joint center, and the welding electrode is uniformly supplied to the welding point by way of a contact pipe in an unjerky and non-twisting manner.

According to a further suggestion of the invention, the distance between the surface of the sheet to be welded and the end of the contact pipe conducting the wire electrode should be kept as small as possible, on an average of about 11–18 mm in a uniform seam joint. Furthermore, it is especially advantageous if the angle between the wire electrode and the sheet surface is between 80° and 100°, and preferably 90°. By means of these steps, a short, smooth arc is achieved.

For the mechanization of the novel process, it is suggested that the welding seam, the welded bead or both are scanned that according to the distance of the seam joint measurements from the theoretical value, the welding speed be changed in such a manner that with a constant residual welding parameters, the filling of the seam joint cross-section is optimum.

Figure 2:
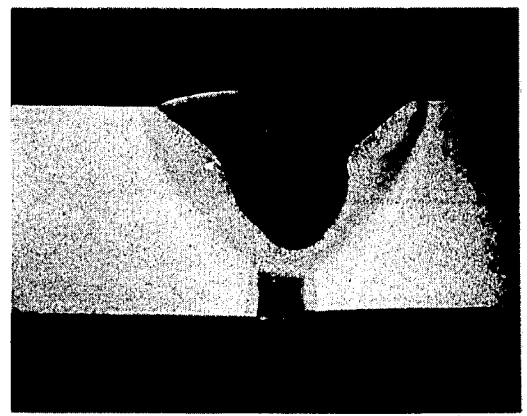
FIG. 2 is a photomicrograph showing the lower part of the results obtained with this invention.

The photomicrograph (inverted 180°) of FIG. 1 illustrates a root layer welded according to the invention in the overhead position. From the photomicrograph, the penetration formed upwards in a mushroom shape is clearly seen. The photomicrograph (inverted 180°) of FIG. 2 illustrates the finished seam consisting of a root layer and the covering layer prepared from above by submerged arc welding. The seam connects two sheets consisting of fine-grained steel, stock No. 9853.

Figure 3:
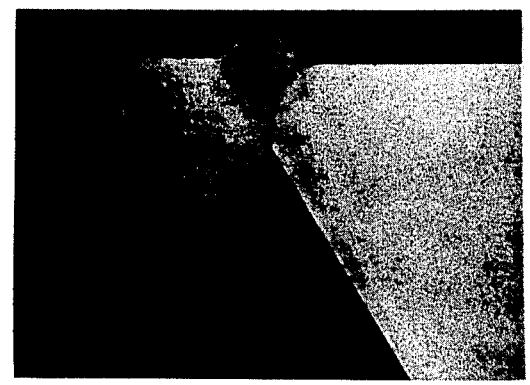
FIG. 3 is a photomicrograph inverted 180° showing the results from a conventional prior art process.

However, in the photomicrograph (inverted 180°) of FIG. 3, which illustrates a seam welded in the overhead position by means of the customary short arc, the seam has a small seam cross-section and a small penetration.

Figure 4:
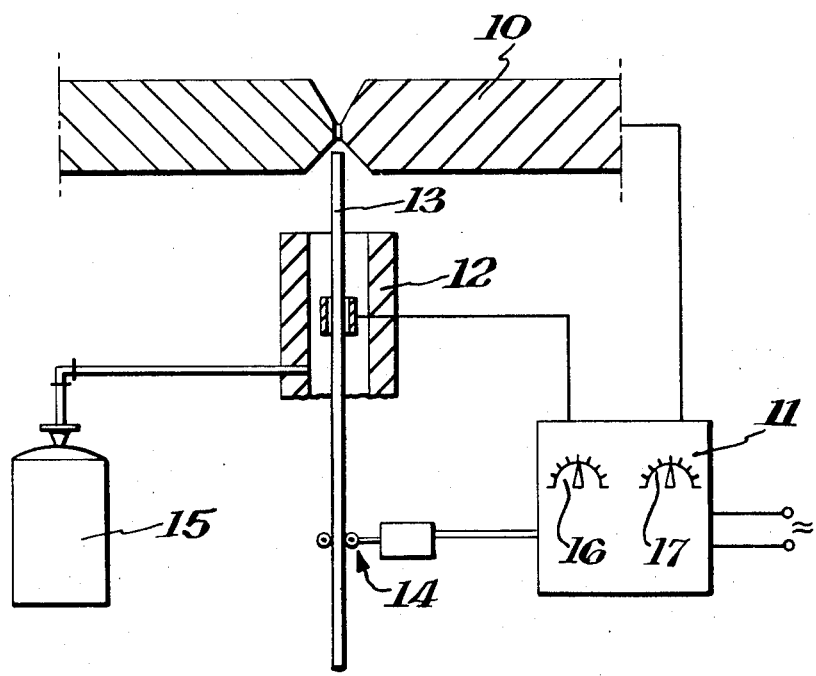
FIG. 4 is a schematic illustration of the practice of this invention.

FIG. 4 schematically illustrates an arrangement for carrying out the practice of this invention. As illustrated therein the workpiece 10 are welded together by means of torch 12 which includes electrode 13 advanced by wire advance 14 with the protective gas being supplied by cylinder 15, FIG. 4 also schematically illustrates the current source 11 and current adjusting means 16 as well as voltage regulator 17.

What is claimed is:

1. In an electric arc welding process for butt welding together sheets of unalloyed and/or low alloyed structural steel disposed directly above a consumable wire electrode used in an overhead position with a protective gas, wherein the improvement comprises performing the welding with a voltage of 25 to 40 V at a current density of 300–400 $A/mm^2$ wire electrode cross section utilizing as the wire electrode an electrode having a diameter of about 0.8–1.2 mm, and utilizing a protective gas containing a significant amount of $CO_2$.

2. A process of claim 1, characterized in that the welding is conducted with a voltage of 31 – 32 V, a current between 260 and 280 A, a wire electrode of 1 mm diameter, and the protective gas being substantially all $CO_2$.

3. A process of claim 2, characterized in that the wire electrode contains alloying elements for increasing the smelting viscosity.

4. A process of claim 3, characterized in that the alloying element is selected from the group consisting of silicon, manganese and chromium.

5. A process of claim 1, characterized in that the torch is moved over the welding slot like a pendulum, and the pendulum amplitude being 1.5–2 mm.

6. A process of claim 5, characterized in that the pendulum movement of the torch is heterodyned by an up-and-down movement, so that the torch follows the seam joint profile.

7. A process of claim 6, characterized in that the torch is moved over the welding slot in a semi-circular pendulum movement, the radius being about 1 mm.

8. A process according to claim 1,, wherein the improvement further comprises conducting the the wire electrode in a contact pipe and maintaining the distance between the surface of the sheet to be welded and the end of the contact pipe conducting the wire electrode to be about 12–18 mm, with a uniform seam joint.

9. A process according to claim 1, characterized in that the angle between wire electrode and sheet surface is between 80° and 100°.

10. A process according to claim 1, characterized in that the angle is 90°.

* * * * *